United States Patent
Yokota

(12) 
(10) Patent No.: US 6,555,938 B2
(45) Date of Patent: Apr. 29, 2003

(54) STATOR FOR A COMMUTATOR MOTOR

(75) Inventor: Tomoyoshi Yokota, Ibaraki (JP)

(73) Assignee: Hitachi Koki Co., LTD, Tokyo (JP)

( * ) Notice: Subject to any disclaimer, the term of this patent is extended or adjusted under 35 U.S.C. 154(b) by 0 days.

(21) Appl. No.: 09/826,852

(22) Filed: Apr. 6, 2001

(65) Prior Publication Data

US 2001/0035691 A1 Nov. 1, 2001

(30) Foreign Application Priority Data

Apr. 7, 2000 (JP) ..................................... 2000-106011

(51) Int. Cl.⁷ ............................ H02K 9/00; H02K 11/00
(52) U.S. Cl. ........................................... 310/71; 310/59
(58) Field of Search ........................... 310/71, 208, 58, 310/52, 53, 179, 180, 45, 214, 260, 254, 59, 60 A

(56) References Cited

U.S. PATENT DOCUMENTS

| | | | | |
|---|---|---|---|---|
| 2,913,606 A | * | 11/1959 | Guardiola | 310/208 |
| 4,616,407 A | * | 10/1986 | Tamaki et al. | 29/596 |
| 4,698,533 A | * | 10/1987 | Kindig et al. | 310/71 |
| 5,723,931 A | * | 3/1998 | Andrey | 310/208 |
| 6,166,461 A | * | 12/2000 | Kusase et al. | 310/58 |

* cited by examiner

*Primary Examiner*—Nestor Ramirez
*Assistant Examiner*—Guillermo Perez
(74) *Attorney, Agent, or Firm*—Sughrue Mion, PLLC

(57) ABSTRACT

In a stator for a commutator motor, at least one of coil end portions 2a wound in a slot of a stator core 1 and protruding in a bundle from opposite end portions of the stator core 1 is divided into at least two portions along a radial direction. A space 5 is provided between the divisions of the coil end portion 2a so that cooling air passes through the space 5.

6 Claims, 2 Drawing Sheets

STATOR FOR A COMMUTATOR MOTOR

BACKGROUND OF THE INVENTION

1. Field of the Invention

The present invention relate to a stator of a commutator motor which is configured so that a stator coil can be cooled efficiently.

2. Description of the Related Art

As known well, a stator of a commutator motor shown in FIGS. 5 and 6 is constituted by a stator core 1, and a stator coil 2 wound in a slot of the stator core 1. The stator coil 2 includes coil end portions 2a protruding axially outward from axially opposite end portions of the stator core 1. The stator coil 2 is connected, through four lead wires 3, to an electric source not shown. The stator coil 2 is supplied with electricity through the lead wires 3.

While the motor runs, the stator coil 2 generates heat so that the temperature rises. Therefore, a cooling fan not shown is generally provided to cool the coil end portions 2a by cooling air. Therefore, the sectional shape of a coil bundle 2b in each coil end portion 2a is formed to be a rectangle having a large surface area to increase the cooling surface area to thereby improve the cooling effect.

For example, in order to change the conventional coil bundle 2b having the 1:1 aspect ratio of the circumferential direction (vertical) to the axial direction (horizon) in sectional size into a coil bundle 2b shaped like an axially long rectangle having the same sectional area as that of the conventional coil bundle 2b but having a surface area not smaller than 1.5 times as large as that of the conventional coil bundle 2b, the axial size of the coil bundle 2b must be enlarged to be not smaller than about 2.6 times as large as that of the conventional coil bundle 2b. To enlarge the shape of the coil bundle 2b axially or radially to thereby increase the surface area thereof is to increase the volume of the motor. Because of restriction of size in design in which the miniaturization of products is regarded as importance, there is some limitation in the measures to enlarge the coil bundle 2b to increase the cooling surface area thereof.

SUMMARY OF THE INVENTION

An object of the present invention is to eliminate the defects in the prior art and increase the heat-radiating surface area of a coil bundle without increase in the number of parts and without any large change of the shape of the coil bundle to thereby improve the heat-radiating performance of a stator coil.

The foregoing object is achieved by dividing at least one of coil end portions protruding in a bundle from a stator core into at least two portions along a radial direction and by providing a space between the divisions of the coil end portion so that cooling air passes through the space.

DETAILED DESCRIPTION OF THE PREFERRED EMBODIMENTS

Figure 1:
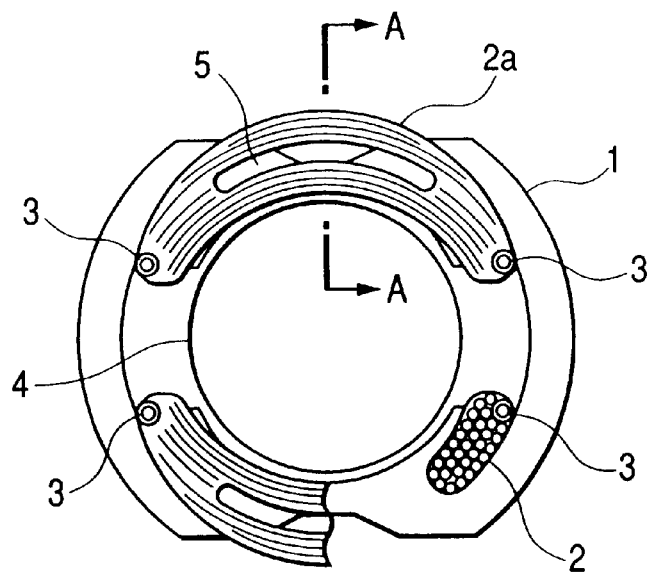
FIG. 1 is a partly sectional front view showing an embodiment of a stator according to the present invention.
Figure 2:
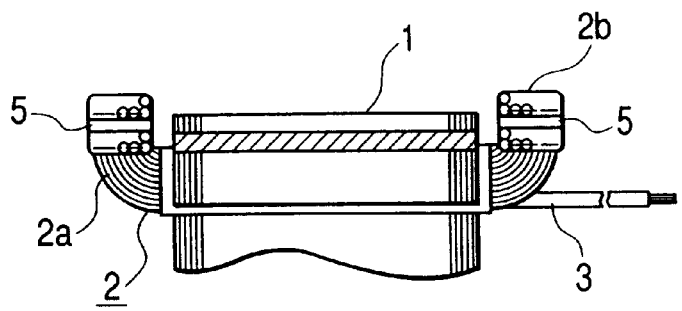
FIG. 2 is a sectional view taken along the line A—A in FIG. 1.

The present invention will be described below with reference to FIGS. 1 and 2 showing an embodiment thereof. The present invention has a feature that a coil bundle 2b formed by each of coil end portions 2a of a coil 2 protruding axially outward from axially opposite end portions of a stator core 1 is divided into two or more portions along a radial direction in a circumferentially approximately center portion and that a space 5 of from about 2 mm to about 3 mm is provided between the radial divisions of the coil bundle 2b. For example, a tool of plastics is made to pass through a coil bundle 2b so as not to injure a magnet wire constituting the stator coil 2 to thereby form the space 5. The space 5 is impregnated with varnish or the like to thereby fix the shape of the space 5. A magnet wire is wound so as to be piled up axially and radially in approximately predetermined directions to thereby form the coil bundle 2b formed by each of the coil end portions 2a. The magnet wire is wound so that the number of magnet wire windings in the axial direction is larger than the number of magnet wire windings in the radial direction. According to the aforementioned embodiment, cooling air can pass through the space 5 because the space 5 is provided between the divisions of the coil bundle 2b. Hence, the coil end portions 2a are cooled efficiently and, accordingly, the stator coil 2 is cooled efficiently. Thus, the rise of the temperature of the stator coil 2 is suppressed.

Figure 3:
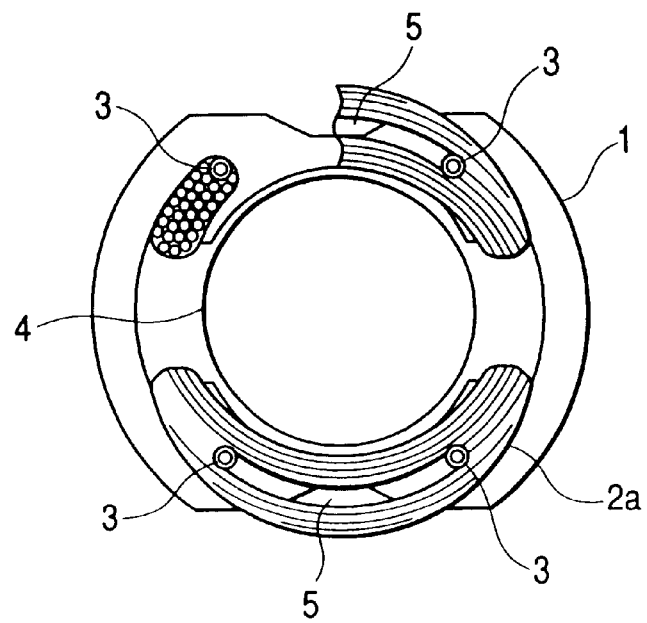
FIG. 3 is a partly sectional front view showing another embodiment of the stator according to the present invention.
Figure 4:
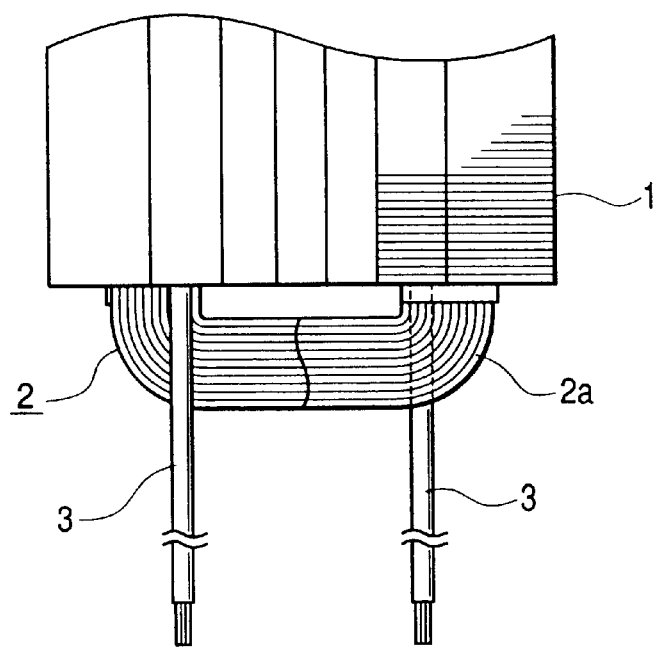
FIG. 4 is a partly sectional top view of FIG. 3.
Figure 5:
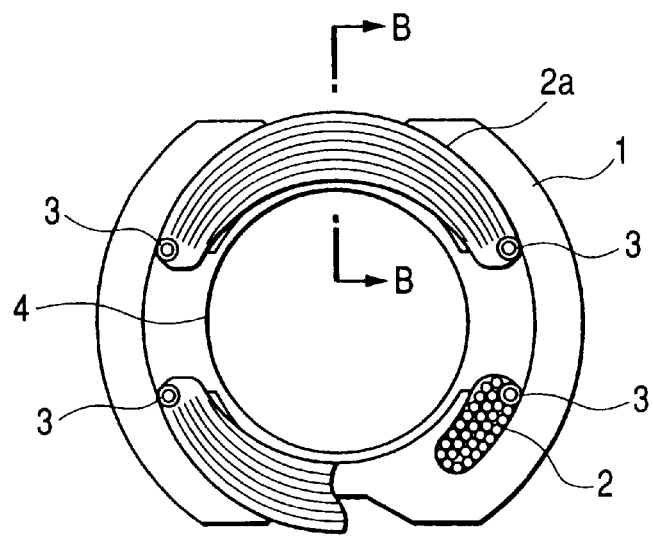
FIG. 5 is a partly sectional front view showing an example of a stator in the prior art.
Figure 6:
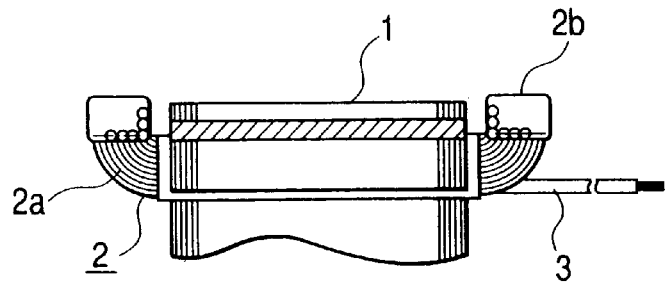
FIG. 6 is a sectional view taken along the line B—B in FIG. 5.

FIGS. 3 and 4 show another embodiment of the present invention, in which the lead wires 3 are positioned in the space 5 so that the lead wires 3 are used as spacers. As a result, the space 5 is preserved so that there is no fear that some external force may block the space 5. Hence, the stator coil 2 is cooled steadily. Incidentally, in this embodiment, it is impossible to position the lead wires 3 in the space 5 of each coil end portion 2a on the deep side in FIG. 3. Therefore, some spacer of an electrically insulating material need be provided as a substitute for the lead wires 3.

Although the aforementioned embodiment has shown the case where the space 5 is provided in each of the two coil end portions 2a protruding from the axially opposite end portions of the stator core, the present invention may be applied also to the case where the space 5 is provided only in one coil end portion 2a. In this case, the space 5 is preferably provided on the upwind side of cooling air to obtain a high cooling effect. Further, a magnet wire coated with a film having thermally fusion-bonding property may be used as the aforementioned magnet wire so that the magnet wire is heated after the formation of the space 5 to thereby fix the shape of the space 5 in the same manner as in the aforementioned embodiment.

As described above, in accordance with the present invention, the space is provided in each of the coil end portions. Hence, the surface of the coil bundle divided by the space serves as a cooling and heat-radiating surface. Hence, the cooling and heat-radiating surface area of the stator coil increases so that the stator coil can be cooled efficiently. Moreover, the structure is a very simple structure in which the coil bundle in each coil end portion is divided. Hence, a low-cost effective stator can be provided without any large change of production steps.

What is claimed is:

1. A stator for a commutator motor, comprising:

a stator core; and a stator coil wound in a slot of said stator core and having coil end portions protruding in a bundle from opposite end portions of said stator core;

wherein at least one of said coil end portions protruding from said stator core is comprised of a first bundle of coil end portions and, a second bundle of coil end portions, said first bundle of coil end portions being radially spaced from said second bundle of coil end portions; and wherein a space is defined in a radial direction between said first and second bundle of coil end portions so that cooling air passes through said space.

2. The stator according to claim 1, wherein lead wires are positioned in said space defined between said first bundle of coil end portions and said second bundle of coil end portions and are disposed in contact with both said first and second bundle of coil end portions to preserve said space.

3. The stator according to claim 1, wherein said coil end portion having said space therein is positioned at an upwind side of the cooling air.

4. A stator for a commutator motor comprising:

a stator core: and a stator coil wound in a slot of said stator core and having coil end portions protruding in a bundle from opposite end portions of said stator core;

wherein at least one of said coil end portions protruding from said stator core is comprised of a first bundle of coil end portions and a second bundle of coil end portions, said first bundle of coil end portions being spaced 2–3 mm in a radial direction from said second bundle of coil end portions, and wherein a space is defined in the radial direction between said first and second bundle of coil end portions so that cooling air passes through said space.

5. A stator for a commutator motor, comprising:

a stator core; and two stator coils each wound in a slot of said stator core and having coil end portions protruding in a bundle from opposite end portions of said stator core, wherein each of said coil end portions of each of said two stator coils protruding from said stator core is comprised of a first bundle of coil end portions and a second bundle of coil end portions, said first bundle of coil end portions being radially spaced form said second bundle of coil end portions, and wherein a space is defined in a radial direction between said first and second bundle of coil end portions so that cooling air passes through said space.

6. The stator according to claim 5, wherein each of said coil end portions protrude axially outward from the opposite end portions of said stator core, and said space is impregnated with varnish to fix the shape of the space.

* * * * *